US012711674B1

(12) United States Patent
Maggor et al.

(10) Patent No.: US 12,711,674 B1
(45) Date of Patent: Aug. 18, 2026

(54) STATIC AND DYNAMICALLY CREATED PRESETS FOR IMMERSIVE VIDEO PRESENTATIONS

(71) Applicant: mmhmm inc., Bentonville, AR (US)

(72) Inventors: Rebekah Maggor, Paris (FR); Phil Libin, Bentonville, AR (US)

(73) Assignee: mmhmm inc., Bentonville, AR (US)

( * ) Notice: Subject to any disclaimer, the term of this patent is extended or adjusted under 35 U.S.C. 154(b) by 141 days.

(21) Appl. No.: 18/816,218

(22) Filed: Aug. 27, 2024

Related U.S. Application Data

(63) Continuation-in-part of application No. 17/941,305, filed on Sep. 9, 2022, now Pat. No. 12,114,095.

(60) Provisional application No. 63/243,650, filed on Sep. 13, 2021.

(51) Int. Cl.

| | |
|---|---|
| ***G06T 11/00*** | (2026.01) |
| ***G06F 40/30*** | (2020.01) |
| ***G06T 19/00*** | (2011.01) |
| ***G06V 20/40*** | (2022.01) |
| ***G11B 27/036*** | (2006.01) |

(52) U.S. Cl.
CPC ............ *G06T 11/00* (2013.01); *G06T 19/006* (2013.01); *G06V 20/41* (2022.01); *G06V 20/46* (2022.01); *G06V 20/48* (2022.01); *G06V 20/49* (2022.01); *G11B 27/036* (2013.01); *G06F 40/30* (2020.01)

(58) Field of Classification Search
CPC ....... G06T 11/00; G06T 19/006; G06V 20/49; G06V 20/46; G06V 20/41; G06V 20/48; G11B 27/036; G06F 40/30
See application file for complete search history.

(56) References Cited

U.S. PATENT DOCUMENTS

| | | | | |
|---|---|---|---|---|
| 10,469,918 | B1 * | 11/2019 | Carlson | G06F 16/783 |
| 2021/0264929 | A1 * | 8/2021 | Osebe | G10L 21/003 |

* cited by examiner

*Primary Examiner* — Xiao M Wu
*Assistant Examiner* — Jai W Li
(74) *Attorney, Agent, or Firm* — Westborough IP Group, LLC

(57) ABSTRACT

Providing a video presentation includes preparing a plurality of presentation presets for a plurality of episodes of the video presentation. Each of the presets includes a set of one or more presenters for the video presentation, materials for the video presentation, and a background environment for the video presentation. Providing a video presentation also includes choosing one of the presets for each of the episodes, actuating each of the presets for each of the episodes, determining a sentiment of the presenters during each of the episodes of the presentation, determining whether the background environment of each of the presets matches the sentiment of the presenters during each of the episodes, and changing the background environment of each of the presets that do not match the sentiment of the presenters during the video presentation. The background environment may include a structured list of visual components and parameters therefor.

16 Claims, 14 Drawing Sheets

STATIC AND DYNAMICALLY CREATED PRESETS FOR IMMERSIVE VIDEO PRESENTATIONS

CROSS-REFERENCE TO RELATED APPLICATIONS

This application is a continuation-in-part of U.S. patent application Ser. No. 17/941,305, filed on Sep. 9, 2022, and entitled "PARAMETRIC CONSTRUCTION OF HYBRID ENVIRONMENTS FOR VIDEO PRESENTATION AND CONFERENCING", which claims priority to U.S. Prov. App. No. 63/243,650, filed on Sep. 13, 2021, and entitled "PARAMETRIC CONSTRUCTION OF HYBRID ENVIRONMENTS FOR VIDEO PRESENTATION AND CONFERENCING", both of which are incorporated herein by reference.

TECHNICAL FIELD

This application is directed to the fields of video recording, visual communications, and user interfaces, and more particularly to the field of construction and use of static and dynamically created presets for immersive video presentations.

BACKGROUND OF THE INVENTION

Hybrid lifestyle is transforming the contemporary workplace, lifestyles, communications, entertainment, and many more areas of our lives. Hybrid companies, hybrid teams, hybrid presentations and communications, hybrid approach to education and training introduce a new and quickly evolving understanding of the future where the physical and the virtual reality, the synchronous and the asynchronous processes are permanently and irreversibly intertwined and are coexisting in a variety of shapes.

Two areas where the hybrid approach creates important and lasting effects are video presentations and video conferencing. Online and local video content is quickly becoming the dominant productivity medium for instructional materials and training, education, marketing, product support and development, e-commerce, business communications and presentations, etc. According to market research, the size of a worldwide market of video marketing alone has reached $33 billion in 2020 and is expected to increase to almost $46 billion by 2025. Usage statistics confirm this trend: an estimated 78% of Internet users watch videos online every week, while 55% watch online videos daily; over 95% of Internet users are watching at least one explainer video for every product or service they are interested in to learn more about their features and functioning. Additionally, video presentations have risen to the third most popular type of video content after explainer and social media videos. Video conferencing, in turn, is quickly growing with the rise of a remote, geographically dispersed workforce, the proliferation of the hybrid lifestyle and in response to multiple challenges caused by the COVID-19 pandemic. Video conferencing is quickly becoming a key communications medium, connecting people through their work, personal, and family lives. According to market studies, 78% of corporate businesses are currently using video conferencing to facilitate team collaboration and 58% of companies incorporate video conferencing into their daily operations. On an average day, US businesses conduct over 11 million video meetings, among which Zoom alone has over 300 million daily participants.

With the emergence of distributed companies and out-of-office work style, authors of video presentations and organizers of video conferences, watch parties and other asynchronous and synchronous activities are often recording their presentations and conducting video conferences from their homes and neighborhoods. The authors are increasingly using augmented reality components of their video materials and are supplementing or replacing realistic interior and exterior views and other types of physical environments with virtual backgrounds and objects, which may benefit aesthetical, entertaining, educational and productivity aspects of the video content. This is especially true for immersive experiences, pioneered by the mmhmm software and other video presentation and conferencing solutions where authors are represented by their real-time segmented images, extracted from the front-camera video streams. In these hybrid environments, presentation material, such as slides, may be projected upon a physical, virtual, or combined backdrop or other type of scene, while presenters or video conference organizers are immersed into the scene.

Accordingly, virtual and immersive presentation and conferencing environments, such as static and animated virtual backgrounds, are quickly growing in popularity. Nearly every leading video conferencing service, including Zoom, Google Meet, and WebEx, are offering extended sets of virtual backgrounds. In addition, applications like ManyCam, SnapCamera, and ChromaCam offer advanced background sets.

Immersive presenters (one presenter, possibly accompanied by co-presenters, or a presenter team) typically stay at their computers or mobile devices and are captured by the front cameras of their devices, segmented, and immersed into the presentation environment. Mutual organization and positioning of immersive images of presenters and of presentation materials, such as slides or foreground objects (for example, immersive or virtual 3D models) plays an important role and invites additional features, such as presentation presets, defining mutual positions of scene components at the start of distinct presentation episodes.

SUMMARY OF THE INVENTION

Notwithstanding recent developments, creation and distribution of virtual environments for video presentations and video conferencing is in its early stage. Systematic, structured approaches to synthesizing virtual and hybrid environments for either usage case have not been built. There are no proven mechanisms for altering virtual environments to follow the flow of video presentations and conferences and update the environments as necessary based on the audience feedback. Intuitive user interfaces for modifying virtual and hybrid environments on the fly have not been developed.

Analogously, there have not been sufficient research and product experience on the effect of immersive presets over the dynamics and various presentation aspects of the related episodes, as well as optimization of the structure of presets for repetitive presentation.

Accordingly, it is useful to provide techniques and systems for synthesizing hybrid environments for video presentations and conferences and developing static and dynamic optimization and use of presentation presets.

According to the system described herein, providing a video presentation includes preparing a plurality of presentation presets for a plurality of episodes of the video presentation, each of the presets including a set of one or more presenters for the video presentation, materials for the video presentation, and a background environment for the video presentation, choosing one of the presentation presets for each of the episodes prior to the video presentation, actuating each of the presentation presets for each of the episodes during the video presentation, determining a sentiment of the presenters during each of the episodes of the presentation, determining whether the background environment of each of the presentation presets matches the sentiment of the presenters during each of the episodes of the presentation, and changing the background environment of each of the presentation presets that do not match the sentiment of the presenters during the video presentation. The background environment may include a structured list of visual components and parameters therefor. Artificial intelligence may be used for determining the sentiment of the presenters and/or determining whether the background environment of each of the presentation presets matches the sentiment of the presenters. At least some of the presentation presets may include optional components. The optional components may include at least one teleprompter for one or more of the presenters, an expiration clock for presentation time control within an episode, rules for changing a background environment, and/or an artificial intelligence component that monitors the presentation and utilizes a technology stack. The technology stack may include voice emotion recognition, facial recognition, speech recognition for obtaining transcripts, and/or sentiment recognition to identify a sentiment of the presenter team and apply the rules for changing the background environment. The background environment may be a physical background environment. A visual component may be superimposed on at least one portion of the physical background environment. A plurality of virtual layers may be superimposed with the physical background environment.

According further to the system described herein, modifying a video presentation includes preparing a plurality of presentation presets for a plurality of episodes of the video presentation, each of the presets including a set of one or more presenters for the video presentation, materials for the video presentation, and a background environment for the video presentation, choosing an initial one of the presentation presets for each of the episodes, analyzing the video presentation by quantifying a first difference between each scene of each episode and the presentation preset corresponding to the episode containing the scene and by quantifying a second difference between the scene and the presentation preset of either a subsequent one of the episodes or, for a last one of the episodes, a last scene of the last one of the episodes, determining a particular scene of each episode having a maximum value of a minimum of the first difference and the second difference, splitting at least one of the episodes into two different episodes at the particular scene in response to a minimum of the first difference and the second difference corresponding to the particular scene being greater than a predetermined threshold, and choosing a new presentation preset for a second one of the two different episodes based on the particular scene. The first difference may be based on a value of a function aggregating metrics of distance between an arrangement of the presenters for each scene of each episode and an arrangement of the presenters for a particular one of the presets corresponding to the episode and the second difference may be based on a value of a function aggregating metrics of distance between an arrangement of the presenters for each scene of each episode and an arrangement of the presenters for either one of the presets corresponding to a subsequent one of the episodes or, for a last one of the episodes, a last scene of the last one of the episodes. The metrics of distance between the arrangements of the presenters are a distance between full or partial orders of the presenters, a ratio of average Hausdorff distances between all pairs of images of the presenters, a distance between bounding rectangles, and/or cubes of the collections of presenter images.

According further to the system described herein, a non-transitory computer readable medium contains software that provides a video presentation using a pre-prepared plurality of presentation presets for a plurality of episodes of the video presentation, each of the presets including a set of one or more presenters for the video presentation, materials for the video presentation, and a background environment for the video presentation. The software includes executable code that chooses one of the presentation presets for each of the episodes prior to the video presentation, executable code that actuates each of the presentation presets for each of the episodes during the video presentation, executable code that determines a sentiment of the presenters during each of the episodes of the presentation, executable code that determines whether the background environment of each of the presentation presets matches the sentiment of the presenters during each of the episodes of the presentation, and executable code that changes the background environment of each of the presentation presets that do not match the sentiment of the presenters during the video presentation. The background environment may include a structured list of visual components and parameters therefor. Artificial intelligence may be used for determining the sentiment of the presenters and/or determining whether the background environment of each of the presentation presets matches the sentiment of the presenters. At least some of the presentation presets may include optional components. The optional components may include at least one teleprompter for one or more of the presenters, an expiration clock for presentation time control within an episode, rules for changing a background environment, and/or an artificial intelligence component that monitors the presentation and utilizes a technology stack. The technology stack may include voice emotion recognition, facial recognition, speech recognition for obtaining transcripts, and/or sentiment recognition to identify a sentiment of the presenter team and apply the rules for changing the background environment. The background environment may be a physical background environment. A visual component and/or a plurality of virtual layers may be superimposed on at least one portion of the physical background environment.

The proposed system offers an environment graph builder and an editing user interface for the parametric construction of video presentation and conferencing environments, adapted to a categorized set of components and parameters of the environments; methods of combining components and assigning the parameters within an environment graph that fully describes an environment; arranging subdomains of allowed parameter changes within the broader parameter feasibility domains, associated with environment graphs and used to facilitate user interfaces for modification (editing) of presentation environments; the automatic and semi-automatic scenarios for multiple environments based on presentation materials and audience feedback, including editing and updating the presentation environments on the fly; the structure and usage of immersive presets, including advanced properties, optimization and AI use for dynamic generation of optimal presets for future presentations with the same scenario.

Various aspects of system functioning are explained as follows.

1. Components of Presentation Environment.

An environment for a video presentation or a video conference (collectively, the "presentation environment") is synthesized from two major parts: background environment and foreground objects.

2. Categorization of Parameters of a Background Environment.

a. Background environments are built using 2D (ordinary and panoramic), 2.5D and 3D basic scenes. The scenes may be any types of visuals (visual components), such as a room interior, a park, a city skyline, a theater, a stadium, a factory, a mountain, a forest, an ocean, or any other view.

b. 2D and 2.5D scenes may be layered over each other to create a 2.5D or a 3D appearance. An example of such layered scene may be a wall of a room with a scenic or regular window and a landscape outside the room visible through the window. An additional layer between the window and the outside view may create additional effects such as fog, rain, or snow.

c. Some of the parameters of a 2D scene are geometry, lighting, and behavior:

i. The geometry of a basic 2D scene may include dimensions, shape, and subdivision into smaller parts (which may also have dimensions and shapes) or connections to larger parts (of other scenes). For example, a wall may have several panes, spaces designated for different furniture items and paintings, a window, a door, and a built-in fireplace, while a landscape may have a fence, a hill, a brook, and several trees.

ii. The lighting parameter is self-explanatory and may include various effects and may emulate weather, time of the day or season, etc.

iii. Behaviors within 2D scenes of the background environment may include animations (including certain visual effects like weather in section 2b), videos played on panes of scenes, and other dynamic effects.

d. Once the geometry of a basic scene is defined, different parts of the basic scene may be characterized by material, color, texture, and ornament (such as ornaments used in animations-geometric and realistic figures, snowflakes, etc.) of the scene and may be semi- or fully transparent providing visibility to subsequent layer(s).

e. In contrast with the basic 2D and 2.5D scenes, complex 3D scenes, such as a pre-rendered city or museum guide, may not have the parameters described above; the geometry, behavior, and lighting conditions of 3D scenes may be more intricate.

3. Physical, Virtual and Hybrid Presentation Environments.

Physical environments captured at locations of the presenter(s) may be used on par with virtual background environments. Combinations of physical environments and hybrid environments may also be offered by the system. For example, a living room of a presenter may include an ordinary window with a city skyline view. A portion of the room with the window may be replaced during the presentation with a virtual presentation environment where a portion of the wall with the window is covered by an emulated scenic window with a view of a garden.

2D and 2.5D layers may appear "in front of" the presenter and the individual presenters and physical environments of the presenter(s) could be combined in separate layers with virtual layers interspersed between the layers. For example, two presenters may be immersed into a hybrid environment for a joint presentation; one of the presenters may always appear behind another one of the presenters when the contours of the presenters overlap. A virtual window behind the presenters may separate the presenters so that one of the presenters appears in a room and another eventually appears behind the window, etc.

4. Environment Graph.

Every background environment may be fully defined by an environment graph, which includes the structured list of components and parameters explained in section 2; for example, layers of a 2D-2.5D environment with basic scenes and all subordinate parameters characterizing each scene, or a 3D basic scene with relevant parameters, such as lighting or weather emulation through visual effects. Note that certain parameters, especially the parameters characterizing behavior related aspects of the environment, may include ranges of dynamically changing values (for example, altering textures on a surface or videos on a video replay pane or a screen of an emulated TV set). Such dynamic ranges and changes of objects and/or their parameters may be captured by schedules and rules. An important behavioral or general parameter of an environment graph is the timeframe of existence of the graph and cyclicity of existence periods of the graph.

5. Environment Construction Tool.

An environment construction tool may be thought of as an environment graph builder. Such a builder may use a categorized repository of basic scenes, scene geometries, associated parameters, and limitations on combining the scenes. A system of rules and algorithms may define feasible combinations of parameters and may direct a user through the most efficient path to creation of an environment graph. The environment construction tool may also have a machine learning component trained on user feedback, success estimates, and recommendations for building background environments better suited to different types of presentations, as further explained below.

6. Parameter Space.

The multi-dimensional space of parameters used by an environment construction tool may include broad ranges of parameters of an environment (entries of a high-res color palette, choice of texture types, images, tiling and decoration patterns, multiple lighting schemes with variable sources, atmospheric conditions, etc.). The environment construction tool may automatically or semi-automatically (under user direction) cut a relatively small area of available parameter values and combinations of the parameters from the large parameter space, the so-called graph feasibility domain. In principle, every combination of parameters that belongs to the feasibility domain of the environment graph may be used within the existence cycle (session) of the graph; but, typically, only a small part of the combinations materializes through the duration of the presentation, subject to additional restrictions by the user.

7. Target Environments for Presentation Slides and Fragments; Scenarios and Transitions.

Different portions of a presentation may require different background environments depending on the content of the slides and of the talk. For example, an analytic portion of a presentation on new trends of training soccer players may use a business-like calm background environment, while a portion of the presentation showing videos, images and in-field diagrams of real-life training process may be more engaging for the audience if the presentation is conducted within an emulated or pre-recorded 2D or 3D stadium environment.

In this way, different presentation materials and portions of a talk of a presenter may drive multiple presentation environments, directed by a presentation environment scenario, which may include transitions between the environment graphs and the overall routine for the execution of the scenario and the functioning of each of the associated environments.

8. Controlling and Updating Background Environments on the Fly.

A presenter or a presentation team may foresee the need to alter the presentation environment on the fly, in real time, depending on the presentation flow, audience reaction, and other factors. While simple cases of such runtime updates may be handled automatically (for example, omitting a slide may cause the scenario execution system to switch automatically to the background environment for the next slide if the next slide is different from the one preceding the omitted piece(s)), other situations may require non-trivial updates to the presentation environment. To this end, the following process of editing background environments on the fly may be implemented:

a. At the construction phase preceding the presentation, the authoring team may choose a domain of allowed (acceptable) parametric changes for each incremental background environment provided by the scenario; such choice is made from a corresponding feasibility domain of the associated environment graph, which is defined elsewhere herein. The allowed changes may follow expectations of a presenter of the required modifications and may be limited to basic changes that assistant(s) of the presenter(s) may perform on the fly without a noticeable interruption to the presentation flow.

b. When the need for a change of the background environment during the presentation becomes apparent, the presenter may activate an environment graph modification user interface on a private pane of the presenter. This may cause a pop-up/drop-down or other type of display of a minimal set of editing controls, and only for the parameters included in the domain of allowed parametric changes. The presenter may choose desired values for the parameters affected by the change and then save the changes. The environment graph would be immediately modified, and the changes would take place.

c. Alternatively (or additionally), the presenter may create and reserve an extra set of presentation environments serving as potential replacements for the main presentation environments that may be activated on demand by the presenter without explicit parametric changes.

9. Presentation Space.

A presentation space includes three components: background environment, presentation materials, and presenter team (the term presentation team is being used synonymously). The background environment is described in sections 1-8 of this Summary. Presentation materials may include slides, videos, images, foreground objects, such as physical and emulated, immersive 3D and 2D models, etc. A presenter team may include a single presenter, a main presenter with permanent or temporary co-presenters, and a group of presenters, each responsible for a certain portion of the presentation and potentially collaborating on different aspects of the presentation.

Traditionally, presentations are divided into logical units called fragments, or episodes; episodes differ by certain parameters, such as presentation materials (often, different episodes are dedicated to presenting different slides), presenter narrations or assigned presenters, presenter collaboration and discussion styles, background environments (see sections 7, 8 above for more information), and other aspects of the presentation. In contemporary immersive presentation applications, such as the mmhmm software created by mmhmm inc., distributed presenters may reside at work or home computers or mobile devices; images of the distributed presenters may be captured by the front cameras of devices of the presenters, segmented out of the work/home environments, and immersed into the presentation space. Presenters may control their immersed images by moving the images across the screen, changing image size, rotating images, pointing to presentation materials, background environments, and other presenters, gesticulating, using image effects (such as presenter image color, contrast, blurring, and animation effects) for expressive and explanatory purpose, etc. Presenter locations, sizes, and groupings are key aspects of the presentation, which may be tied to presentation episodes.

10. Building and Using Static Presets.

Presets are broadly used in technical processes associated with different sides of our everyday lives, from photography and theater to cooking and gaming. Using pre-designed starting scenes of presentation episodes as presets serves as an important organization tool for multi-segment presentations with significantly altering components of the presentations space.

a. If $D$ =( $\mathbb{B}$, $\mathbb{M}$, $\mathbb{A}$, $\mathbb{E}$, $\mathbb{S}$) is a presentation with a set of background environments $\mathbb{B}$,, a set of presentation materials $\mathbb{M}$,, a presenter team $\mathbb{A}$,, a set of episodes $\mathbb{E}$,, and a set of scenes for subsequent frames $\mathbb{S}$={ $S$(t)}, then a preset $P_E$ for an episode E∈ $\mathbb{E}$ is a pre-designed initial scene of an episode E, which combines the background environment, the presentation materials, and the immersive images of presenters, complete with their appearances and locations (denoted with an accent $\vec{A}$) at the starting time $$t_E^0$$

of the episode E:

$$P_E = S(t_E^0) = \left(B(t_E^0), M(t_E^0), \vec{A}(t_E^0)\right)$$

b. Accordingly, the properties of a preset include a basic (mandatory) preset descriptor $$P_E^m = \left(B(t_E^0), M(t_E^0), \vec{A}(t_E^0)\right),$$

and may also include an advanced (optional) preset descriptor $$P_E^o.$$

c. The optional advanced preset descriptor $$P_E^o$$

may include some or all of the additional components that allow presentation control and may drive limited modifications throughout the episode, including: teleprompter(s), expiration/time control clock (both displayed to one or more members of the presenter team), rules for changing presentation environment on the fly, an AI component that monitors the presentation, uses the rules and utilizes a technology stack (speech recognition for obtaining transcripts, voice emotion, gesture, and facial recognition, sentiment recognition) to identify the sentiment of the presenter team.

d. One example of use of the rules for changing presentation environment on the fly is changing the background from light to dark in response to identification by the AI component of the change of presenter mood from enthusiastic to concerned.

11. Building New Presets on the Fly.

Many aspects of a creative presentation may significantly change on the fly, including grouping and positions of presenters, tonality and micro-topics of discussion, order of presenters within some episodes, etc. For repetitive presentations, such as regular webinars or ongoing presentation series, such changes may justify partial reorganization of the presentation by dynamically identifying new presets and splitting episodes by inserting these presets.

a. A proposed method of dynamic identification of the new presets is based on maximization of the min-delta function δ, $$\delta(\cdot,\cdot) = \min\left(\Delta^1(\cdot,\cdot), \Delta^2(\cdot,\cdot)\right) \tag{11.1.}$$

(explained in subsection 11c below) that measures the difference between the presentation scenes associated with the frames of a recorded presentation video and the two closest presets, the first one being a preset starting the presentation episode to which the current frame belongs and the next being the preset associated with the next episode (or the final scene of the presentation if the current frame belongs to the last episode).

b. If the maximum value of the min-delta function exceeds a predefined threshold, then any of the scenes delivering that maximum value may be used as a new preset inserted at the position of the corresponding frame. Such presets may be built based on min-delta maximum for any parameter (provided the maximum is above the threshold for that parameter) or may be required to deliver the high differentiating value for a set of parameters—for example, a simultaneous high difference in presenter grouping and background environment.

c. A general form of the min-delta function maximization task is as follows:

$$\max_t \min\left(\Delta_\rho(S(t), P_E^o), \Delta_\rho\left(S(t), P_{E^+}^o\right)\right), \tag{11.2}$$

where the delta-function $\Delta_\rho\ (S_1, S_2)$ measures the difference of two scenes by the parameter (factor, feature) ρ, which may reflect properties of the background environment, characteristics of presentation materials, appearance, location, or grouping of presenters in the presenter team, etc.;

$$P_E^o, P_{E^+}^o$$

are respectively the presets for the current episode E (to which the scene $S$ (t) belongs) and the next episode $E^+$; if the current episode is the last episode of the presentation, then $$P_{E^+}^o$$

is set to the last scene in the presentation.

d. One of the most important parameters used in presets is the grouping and location of presenters within the presentation space. The delta function reflecting the uniqueness of grouping/locations of the presenters may be designed and assessed as follows.

i. Immersive images of presenters $\vec{A}_1$, $\vec{A}_2$ in each of the two scenes $S_1, S_2$ may be ordered via an adequate full or partial order $\mathcal{R}$. For example, with two- or three-dimensional scenes, a lexicographic order of coordinates (x, y), (x, y, z) of geometric centers of each immersive image $a \in \vec{A}_i$ may be used.

ii. A distance $d\ (\mathcal{R}_1, \mathcal{R}_2)$ between the two orders $\mathcal{R}_1$ $\mathcal{R}_2$ in the space of partial orders may be calculated. The distance $d$ reflects the regrouping of presenter images: the higher the distance, the stronger the regrouping.

iii. An average Hausdorff distance between the pairs of presenter images in each scene may be calculated, $\bar{h}_i = \mathrm{Avg}_{k,l}\{\ \mathcal{H}(a_k, a_l)\}$ (i=1, 2, $\mathcal{H}$ is the Hausdorff distance). The ratio $\mathfrak{r}(S_1, S_2) = \bar{h}_1 / \bar{h}_2$ (or other measure of the difference between the two average distances) correlates with the spatial distribution of presenters in each scene.

iv. A distance $\alpha(S_1, S_2)$ between the bounding rectangles (or cubes in the three-dimensional space) of the collections of presenter images may be calculated; the distance shows the degree of shift of the presenter team across the screen.

v. Finally, the delta function for building and maximizing the min-delta function (see subsection 11c above) is defined as an aggregated value of the partial measures of dissimilarity of two sets of immersive presenter images:

$$\Delta_g(S_1, S_2) = \mathcal{F}(d(R_1, R_2), \mathfrak{r}(S_1, S_2), \alpha(S_1, S_2)), \tag{11.3}$$

where the subscript $g$ denotes grouping and $\mathcal{F}$ is an aggregating function, such as a weighted sum of normalized values of its arguments.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for building and using basic and advanced immersive presets for enhancing and organizing video presentations, and dynamic creation and optimization of new presets based on the properties of presentation space and presenter behavior during the presentation.

Figure 1:
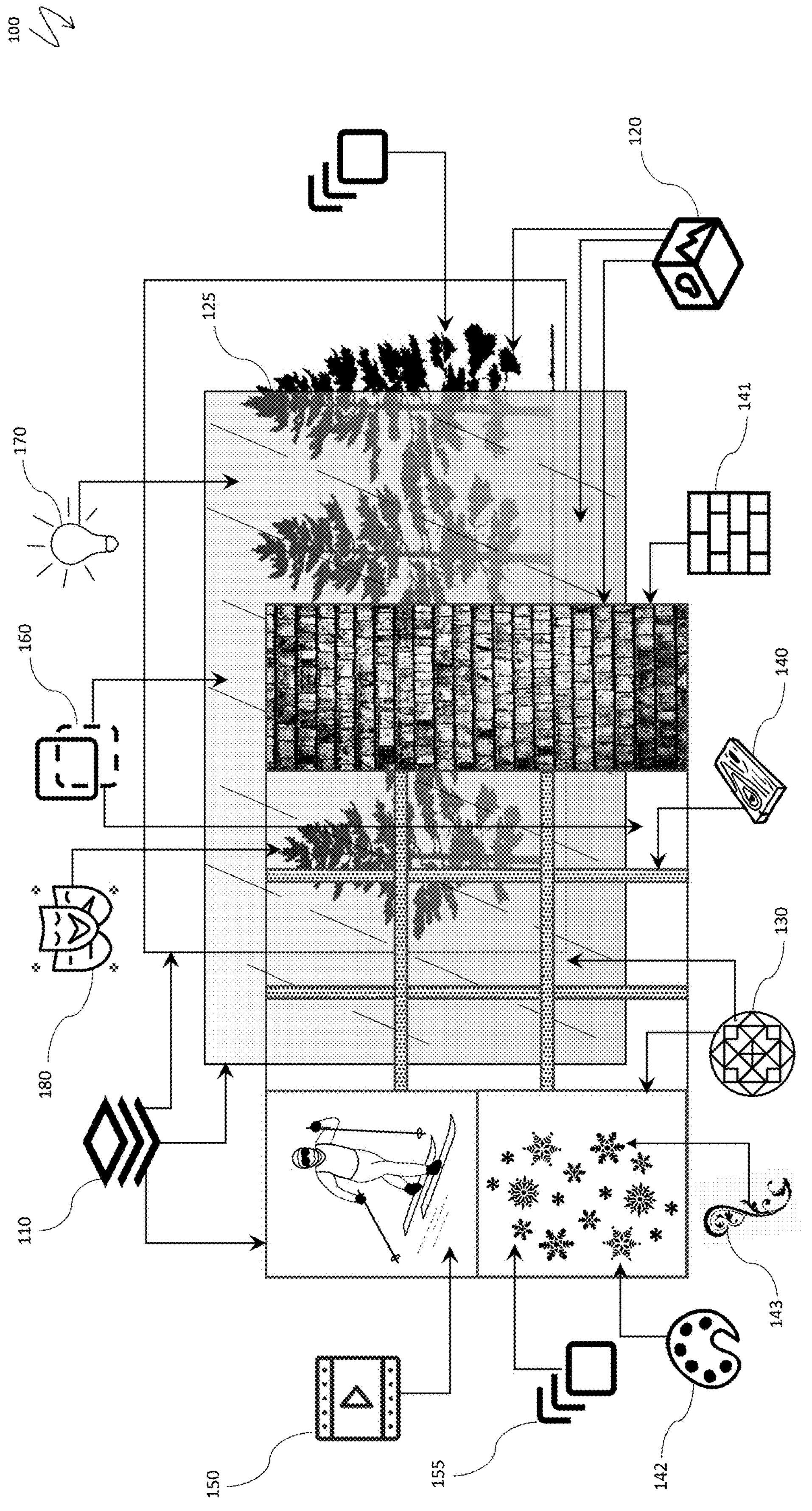
FIG. 1 is a schematic illustration of parameters and properties of a background environment for video presentations, according to an embodiment of the system described herein.

FIG. 1 is a schematic illustration 100 of parameters and properties of a background environment for video presentations. The presentation environment illustrated in FIG. 1 consists of multiple layers 110, where each of the layers 110 may include one or more basic scenes 120. Each of the basic scenes 120 or any object 125 in one of the basic scenes 120 may have a particular geometry 130, material 140, texture 141, color 142, and ornament (décor) 143. Furthermore, a background environment may include videos 150 running on object surfaces (such as panes), animations 155 (in the illustration 100, a multicolor "snowflake" ornament is animated). Various objects and surfaces within scenes, and whole layers may possess semitransparency, as indicated by an icon 160, may be subject to lighting effects 170 and may have attached behaviors 180 (such as rain or swaying of treetops in the wind).

Figure 2C:
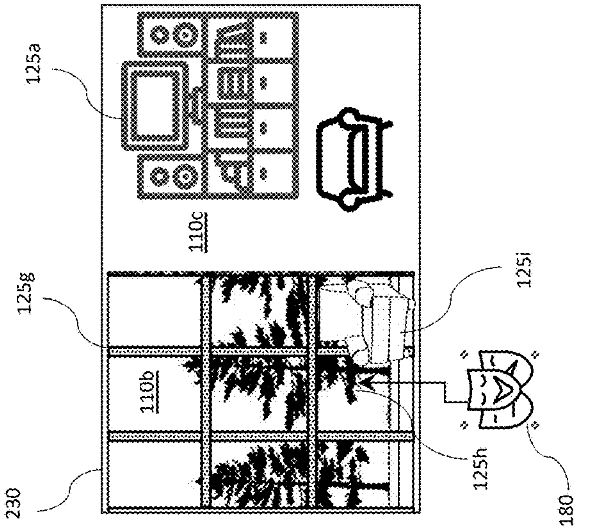
FIGS. 2A-2C are schematic illustrations of physical, virtual and hybrid presentation environments, according to an embodiment of the system described herein.
Figure 2B:
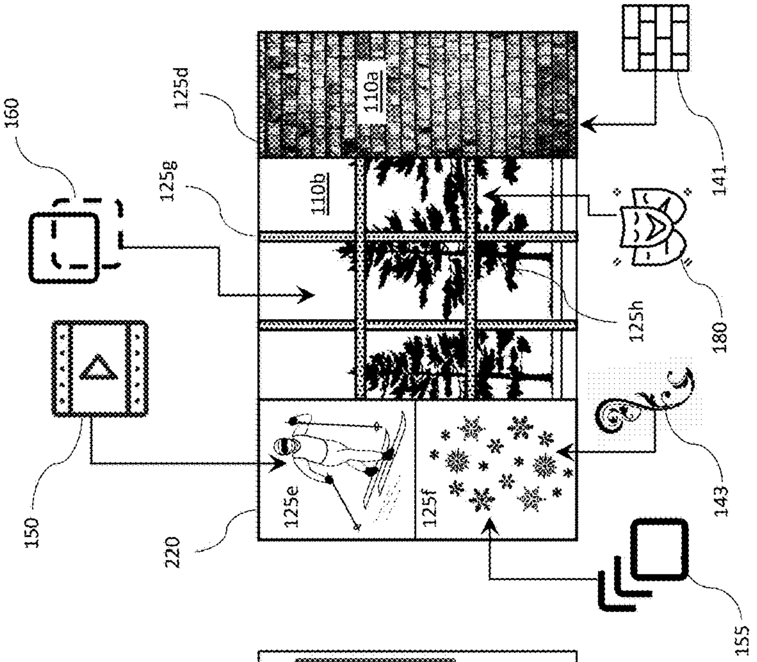
Figure 2A:
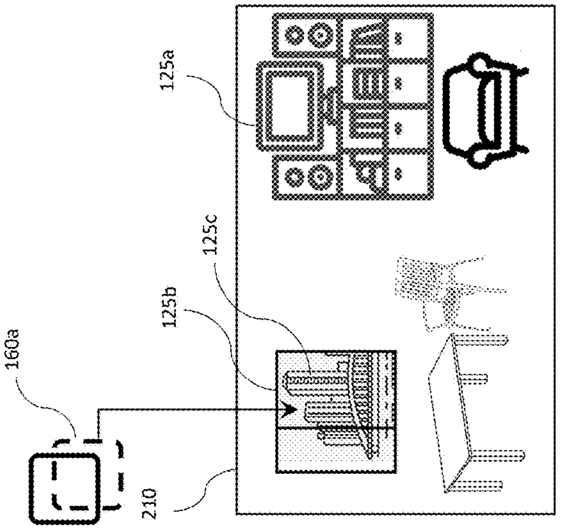

FIGS. 2A-2C are schematic illustrations of physical, virtual and hybrid presentation environments.

FIG. 2A shows a physical presentation environment 210, which is a basic scene with furniture objects 125*a*, a window 125*b*, and a city skyline 125*c* that can be seen through the window 125*b*, which is transparent, as indicated by the icon 160*a*.

FIG. 2B shows a virtual presentation environment 220, which is synthesized and combines a first layer 110*a* and a second layer 110*b*. The first layer 110*a* includes a basic scene with four objects: a fragment 125*d* of a wall, textured as indicated by an icon 141; two panels 125*e*, 125*f*, where the panel 125*e* has videos 150 projected upon the panel 125*e*, and the panel 125*f* has an animated ornament 143, as indicated by the animations 155; and a scenic window 125*g* (having transparency indicated by the icon 160) displaying a view of the second layer 110*b* with a tree line 125*h*, assigned the behaviors 180.

FIG. 2C illustrates a hybrid presentation environment 230, physical and virtual, with a layer 110*c* and the layer 110*b*. The layer 110*c* combines a fragment of the physical presentation environment 210 (FIG. 2A) with the furniture objects 125*a* and a fragment of the virtual presentation environment 220 (FIG. 2B)-specifically, the window 125*g*; the layer 110*c* also includes an additional physical object, an armchair 125*i* positioned in front of the virtual window 125*g*. The second layer 110*b* is purely virtual and the same as in FIG. 2B.

Figure 3B:
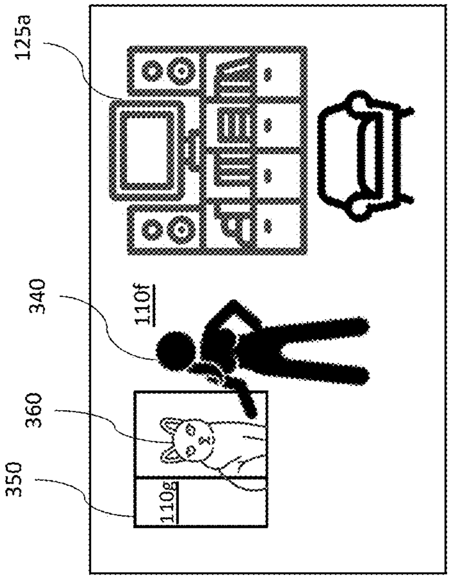
FIGS. 3A-3B are schematic illustrations of different dispositions of physical and virtual layers in presentation environments, according to an embodiment of the system described herein.
Figure 3A:
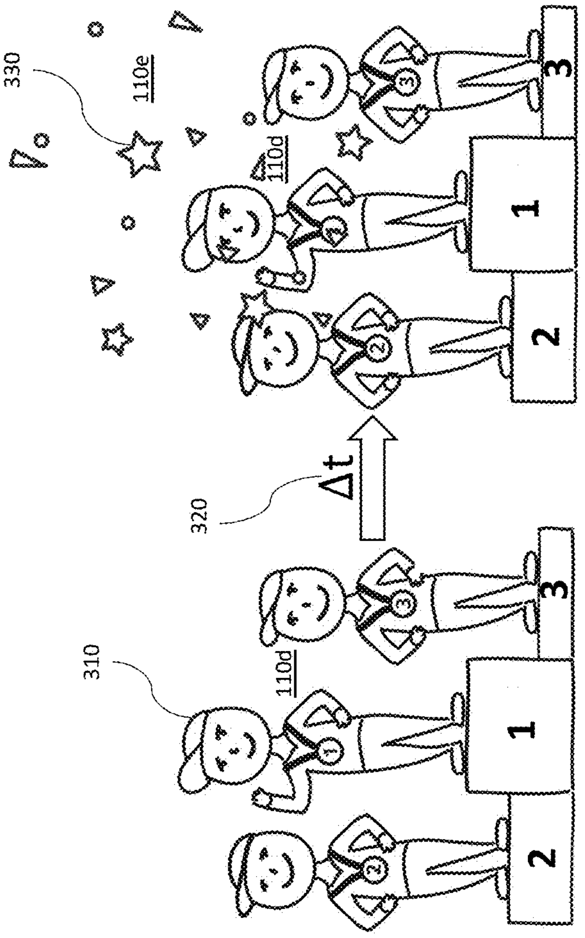

FIGS. 3A-3B are schematic illustrations of different dispositions of physical and virtual layers in presentation environments.

FIG. 3A illustrates the physical layer 110*d* with individual winners 310 of a tournament (i.e., objects), which is transformed after a short time interval 320 into a celebration ceremony, where a new transparent virtual layer 110*e* contains multi-shaped confetti 330, falling over the winners 310 in front of the physical layer 110*d*.

FIG. 3B shows a physical layer 110*f* with the furniture items 125*a* (see FIGS. 2A, 2C), a female FIG. 340 and a window 350, through which the female FIG. 340 (and an observer) may see a virtual layer 110*g* with a virtual object 360, located behind the physical layer 110*f*.

Figure 4:
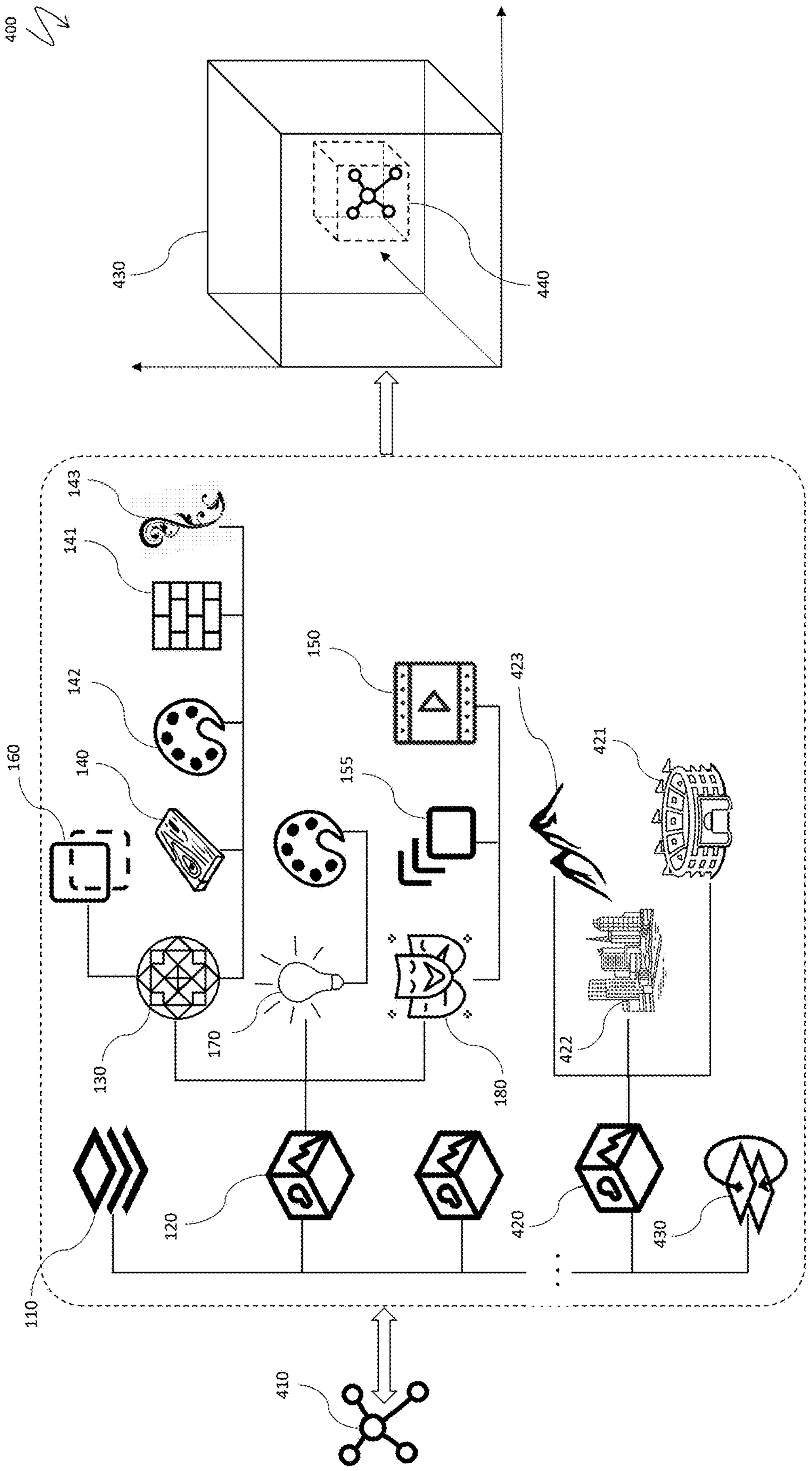
FIG. 4 is a schematic illustration of an environment graph, components of the environment graph, and a parameter space of the environment graph, according to an embodiment of the system described herein.

FIG. 4 is a schematic illustration 400 of an environment graph 410, components of the graph 410, and a parameter space of the graph 410. The environment graph 410 may have the multiple layers 110, each having one or more of the basic scenes 120 or complex (possibly pre-rendered) non-layered 3D scenes 420, as explained elsewhere herein (see, for example, section 2 of the Summary). Composition and organization of the layers 110 may be driven by layering rules 430.

The basic scenes 120 include objects (not shown in FIG. 4, see items 125, 125*a*-125*i* in FIGS. 1, 2A-2C) with multiple parameters and properties: geometry 130, material 140, color 142, texture 141, ornament 143, transparency 160, lighting 170 (next to a lighting item is a non-referenced light color icon), behaviors 180, animation 155, and videos 150. As to the complex 3D scenes 420, FIG. 4 illustrates three examples: a stadium 421, a city skyline 422, and a mountain range 423.

As explained elsewhere herein (see, for example, sections 4, 6 of the Summary), a full parameter range for the layering rules 430 may be too broad and, for practical construction of presentation environments, feasibility domains 440 of scene and object parameters may be used and further restricted for certain applications.

Figure 5:
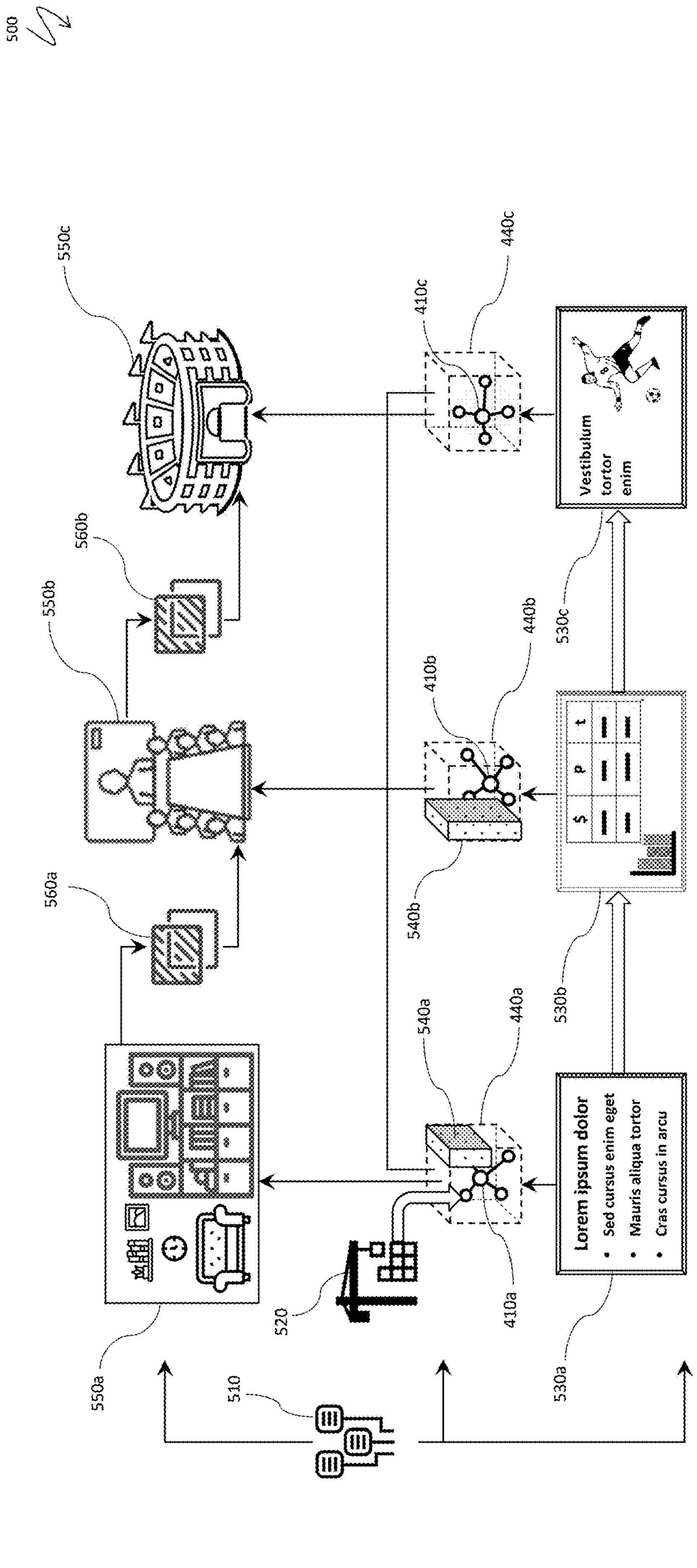
FIG. 5 is a schematic illustration of a scenario for background presentation environments, according to an embodiment of the system described herein.

FIG. 5 is a schematic illustration 500 of a scenario 510 for background presentation environments. The scenario 510 contains an optimized set of background environments 550*a*, 550*b*, 550*c* for a presentation with audio-visual transition 560*a*, 560*b*, and a series of slides 530*a*, 530*b*, 530*c*. For each slide (or other presentation component, which may be a fragment of a freeform or a continuous presentation, a video, or another visual form), an authoring team builds a plurality of environment graphs 410*a*, 410*b*, 410*c* (see FIG. 4 for more info) using an environment construction tool 520, explained elsewhere herein (see FIG. 4, the accompanying text, and section 5 of the Summary). Additionally, feasibility domains of parameters 440*a*, 440*b* for two of the created environment graphs 410*a*, 410*b* may be further narrowed down to allowed (acceptable) sets of parameters 540*a*, 540*b*. The restricted parameter ranges may be used for a simplified instant editing of background environments on the fly. As graphically illustrated in FIG. 5, restriction (narrowing down) of the set of parameters does not apply to the environment graph 410*c*, which uses the full feasibility domain 440*c*. Each of the background environments implemented in the scenario 510 reflects the nature, complexity, and emotional state of a talk related to a corresponding slide, which is presented within a particular one of the environments.

Figure 6:
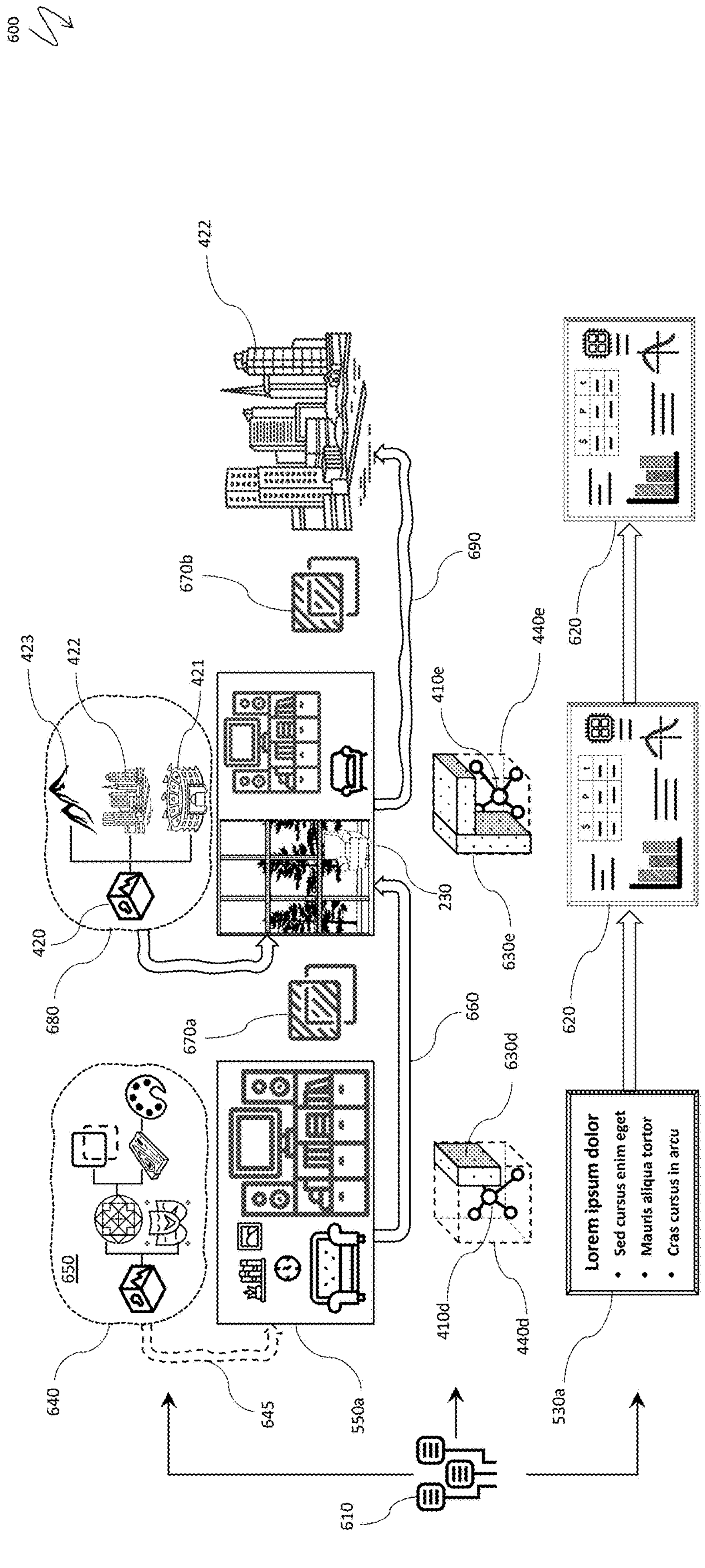
FIG. 6 is a schematic illustration of editing presentation environments in real time, according to an embodiment of the system described herein.

FIG. 6 is a schematic illustration 600 of editing presentation environments in real time. Analogously to FIG. 5, a scenario 610 contains an optimized set of background environments enhancing a presentation impact for the slide 530*a* (same as in FIG. 5) and another slide 620. For each of the slides 530*a*, 620, an original environment graph is built and added to the scenario 610. Specifically, an environment graph 410*d* with a feasibility domain of parameters 440*d* represents the slide 530*a*, and a graph 410*e* with a feasibility domain 440*e* is built for the slide 620 (see FIGS. 4, 5 and the accompanying texts for more info). Additionally, the two feasibility domains 440*d*, 440*e* are further narrowed down, and two allowed (acceptable) sets of parameters 630*d*, 630*e* are added to the scenario 610 and may be used for simplified editing of background environments on the fly.

When the presenter talks about the first slide 530*a*, the slide 530*a* and a presenter image may be immersed into the first background environment 550*a* (same as in FIG. 5) described within the scenario 610 by the first environment graph 410*d*. At some point during the presentation of the slide 530*a*, the presenter may realize that the talk or the audience feedback does not fully endorse the background environment 550*a*; the presenter may then invoke an editing interface 640 on a private presenter screen or pane, as explained elsewhere herein; the editing interface 640 includes a portion 650 of the environment graph 410*d*, subject to allowed (editable) sets of parameters, schematically shown as a dotted parallelepiped 630*d*. In FIG. 6, the presenter initially intends to modify the background environment 550*a* as shown by a sketched and dashed arrow 645; however, the presenter decides against the change, completes the portion of the presentation related to the first slide 530*a*, and moves to the next slide 620 and the virtual environment 230 (see FIG. 2C) in accordance with the original scenario 610, which is illustrated by a regular arrow 660 and is accompanied by an automatically created audio-visual transition 670*a*.

Like the presentation of the first slide, the presenter may be dissatisfied with the presentation flow and/or the audience reaction (not shown in FIG. 6) to the second slide 620 and may invoke a runtime editing interface 680, which is different from the first editing interface 640. The runtime editing interface 680 provides an instant editing option, represented by the parameters 630*e* in connection with the environment graph 410*e*, includes an option of replacing the whole virtual environment 230 with a complex 3D space, as explained above in connection with the items 420-423 (a replica of a fragment of the general environment graph 410 shown in FIG. 4, which has more info on this option). In this case, the presenter chooses the 3D environment 422 (a portion of the city skyline) and replaces the background environment on the fly, as shown by a sketched arrow 690. Simultaneously, an audio-video transition segment 670*b* is generated and displayed, so that the scenario 610 is modified on the fly (the modification may be recorded for files of the presenter, for future machine learning opportunities and for other uses), and the presenter completes the talk related to slide 620 within the new background environment 422.

Figure 7:
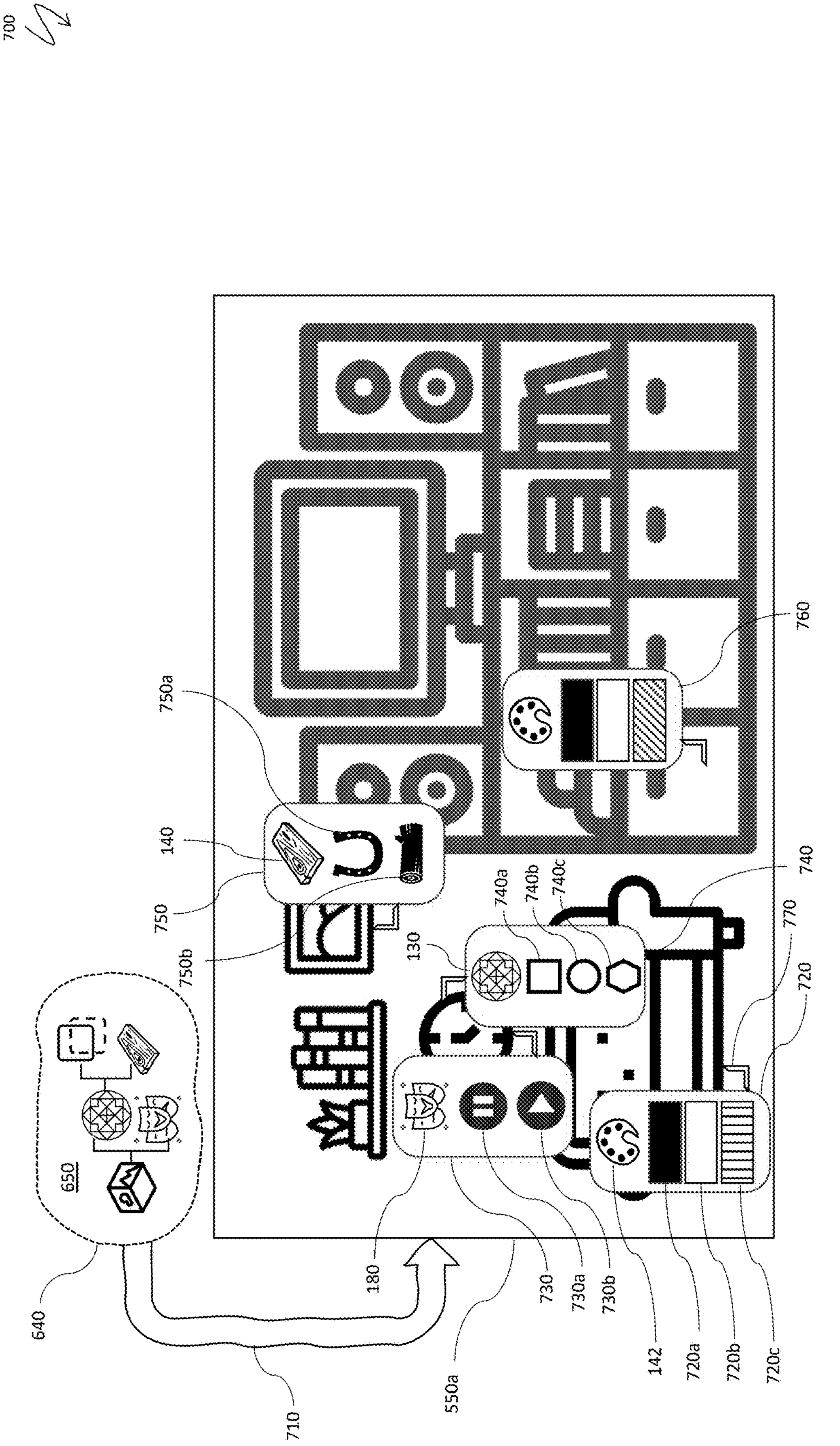
FIG. 7 is a schematic illustration of a contextual user interface for editing presentation environments in real time, according to an embodiment of the system described herein.

FIG. 7 is a schematic illustration 700 of a contextual user interface for editing presentation environments in real time. During a presentation, the presenter (not shown in FIG. 7) invokes the real-time editing interface 640 to modify the background environment 550*a* (see FIG. 6). As in FIG. 6, the portion 650 of the environment graph 410*d* (a subdomain of the feasibility domain) represents a fragment of the general environment graph of FIG. 4 with additionally restricted values for each parameter, as explained below.

In contrast with the FIG. 6 where the presenter abandons editing, in FIG. 7 the presenter actuates the contextual editing interface, as indicated by a solid sketched arrow 710. The presenter action results in a set of contextual drop-down panes 720, 730, 740, 750, 760, attached to the editable objects by angular brackets 770. Each of the panes 720, 730, 740, 750, 760 corresponds to a specific parameter, explained in conjunction with the definition of the environment graph in FIG. 4 and displayed on top of each of the panes 720, 730, 740, 750, 760, with allowed values shown below the parameter icon in each of the panes 720, 730, 740, 750, 760.

The pane 720 is attached to a couch and allows modifying the upholstery color. The pane 720 includes the color icon 142 (see FIG. 4 for the enumeration of all parameters) and three color values: black 720*a*, white 720*b* and beige 720*c*.

The pane 730 is a behavior pane attached to a wall clock; an icon for the behaviors 180 is accompanied by two available values: a clock illustration with still hands 730*a*, and a fully functioning clock 730*b*.

The pane 740 is another pane for editing the wall clock; the pane 740 allows changing the geometry 130, the clock shape, between a square shape 740*a*, a round (current) shape 740*b*, and a hexagonal shape 740*c*.

The pane 750 (the material icon 140 is placed on top of the pane) allows modifying material of the picture frame between metal 750*a* and wood 750*b*.

The pane 760 is a color pane and is analogous to the pane 720 and controls the color of a bookcase, differing in the third color (for example, a mahogany wood).

Figure 8:
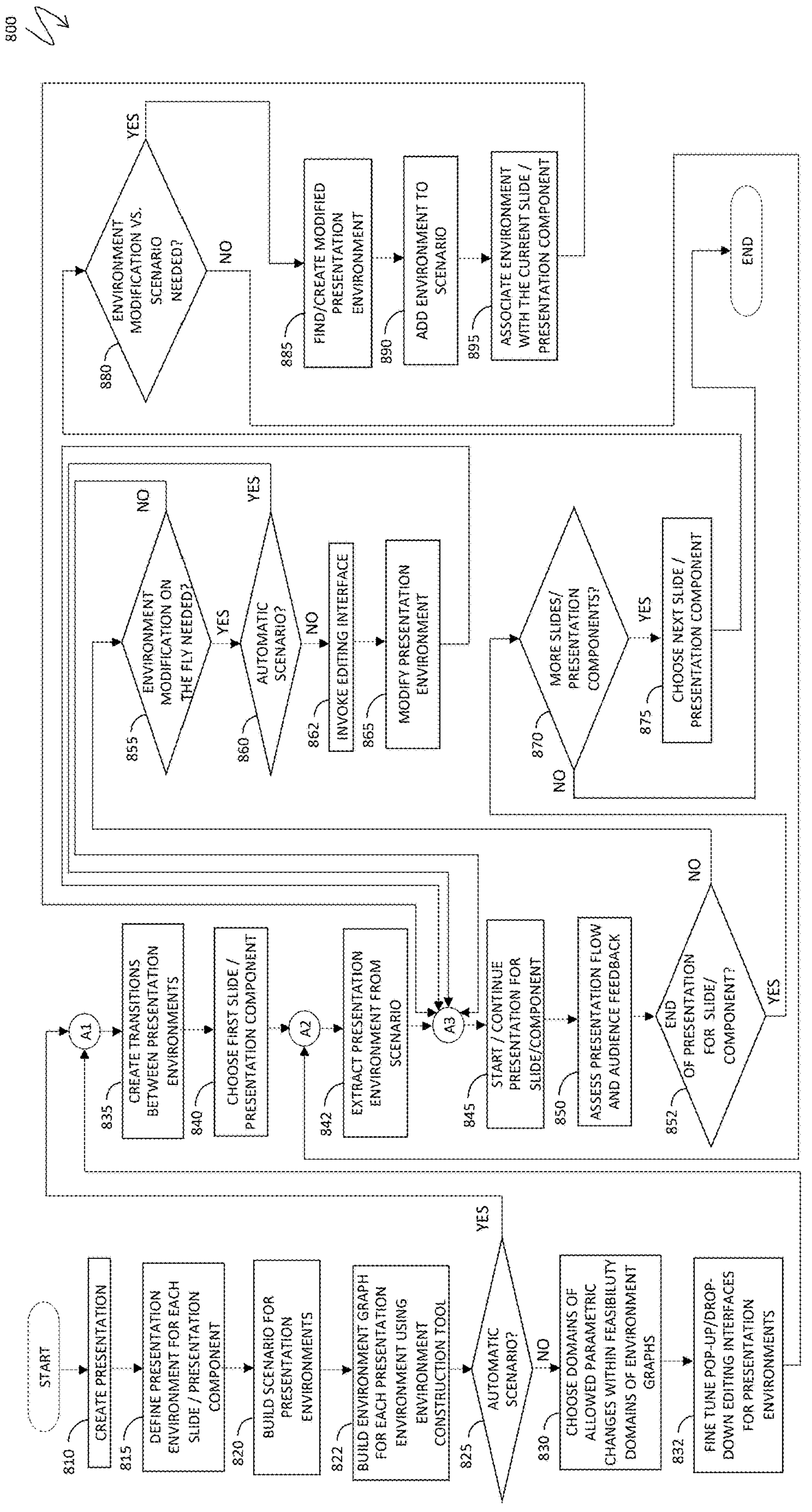
FIG. 8 is a system flow diagram illustrating system functioning in connection with building, editing, and using background environments for presentations, according to an embodiment of the system described herein.

Referring to FIG. 8, a system flow diagram 800 illustrates system functioning in connection with building, editing, and using background environments for presentations. Processing begins at a step 810, where a presentation is created. After the step 810, processing proceeds to a step 815, where a draft of a desired presentation environment is defined for each slide or other presentation component. After the step 815, processing proceeds to a step 820, where a scenario is built for the presentation environments, as explained elsewhere herein (see, for example, FIGS. 4-6 and the accompanying text). After the step 820, processing proceeds to a step 822, where an environment graph is built for each background environment corresponding to a slide or other presentation component using an environment construction tool (see, for instance, section 5-7 of the Summary and FIGS. 4, 5 with the accompanying text).

After the step 822, processing proceeds to a test step 825, where it is determined whether a chosen scenario is automatic, i.e., does not allow runtime modifications of the background environments. If not, processing proceeds to a step 830, where subdomains of allowed parametric changes are chosen within feasibility domains of environment graphs, as explained in connection with FIGS. 5, 6. After the step 830, processing proceeds to a step 832, where a presentation team fine-tunes pop-up, drop-down and other interface components to facilitate instant runtime editing of presentation environments. After the step 832, processing proceeds to a step 835, where transitions between presentation environments corresponding to all pairs of adjacent slides (or other presentation components) are created. (Note that the step 835 may be independently reached from the test step 825 if it is determined that the chosen scenario is automatic.)

After the step 835, processing proceeds to a step 840, where the presenter chooses the first slide or presentation component. After the step 840, processing proceeds to a step 842, where the presentation environment originally designed for the current slide (presentation component) is extracted from the scenario. After the step 842, processing proceeds to a step 845, where the presenter starts or continues presentation for the current slide/component. After the step 845, processing proceeds to a step 850, where the system and the presenter (presenter's team) jointly assess the presentation flow and the audience feedback. After the step 850, processing proceeds to a test step 852, where it is determined whether the end of presentation for the current slide (or the current presentation component) has been reached. If not, processing proceeds to a test step 855, where it is determined whether a modification of the current environment on the fly is required/desired. If not, processing proceeds to the step 845, discussed above, which may be independently reached from the step 842; otherwise, processing proceeds to a test step 860, where it is determined whether the scenario is automatic. If so, processing proceeds to the step 845, which may be independently reached from the step 842 and the test step 855; otherwise, processing proceeds to a step 862, where the presenter invokes the runtime editing interface, as explained elsewhere herein (see FIG. 6 and the accompanying text). After the step 862, processing proceeds to a step 865, where the presenter modifies the presentation environment on the fly, as explained in connection with FIG. 6. After the step 865, processing proceeds to the step 845, which may be independently reached from the step 842 and the test steps 855, 860.

If it is determined at the test step 852 that the end of presentation for the current slide or other presentation component has been reached, processing proceeds to a test step 870, where it is determined whether there are more slides or presentation components in the presentation. If not, processing is complete; otherwise, processing proceeds to a step 875, where the presenter (or an assistant or, automatically, the system) chooses a next slide or a next presentation component. After the step 875, processing proceeds to a test step 880, where it is determined whether an instant modification of the background environment or the scenario is needed. If not, processing proceeds to the step 842, which may be independently reached from the step 840; otherwise, processing proceeds to a step 885, where the modified presentation environment is created or found (analogously to the choice of a complex 3D environment in the middle of the presentation in FIG. 6). After the step 885, processing proceeds to a step 890, where the new presentation environment is added to the scenario. After the step 890, processing proceeds to a step 895, where the new background environment is associated with the current slide or other presentation component. After the step 895, processing proceeds to the step 845, which may be independently reached from the steps 842, 865 and the test steps 855, 860.

Figure 9A:
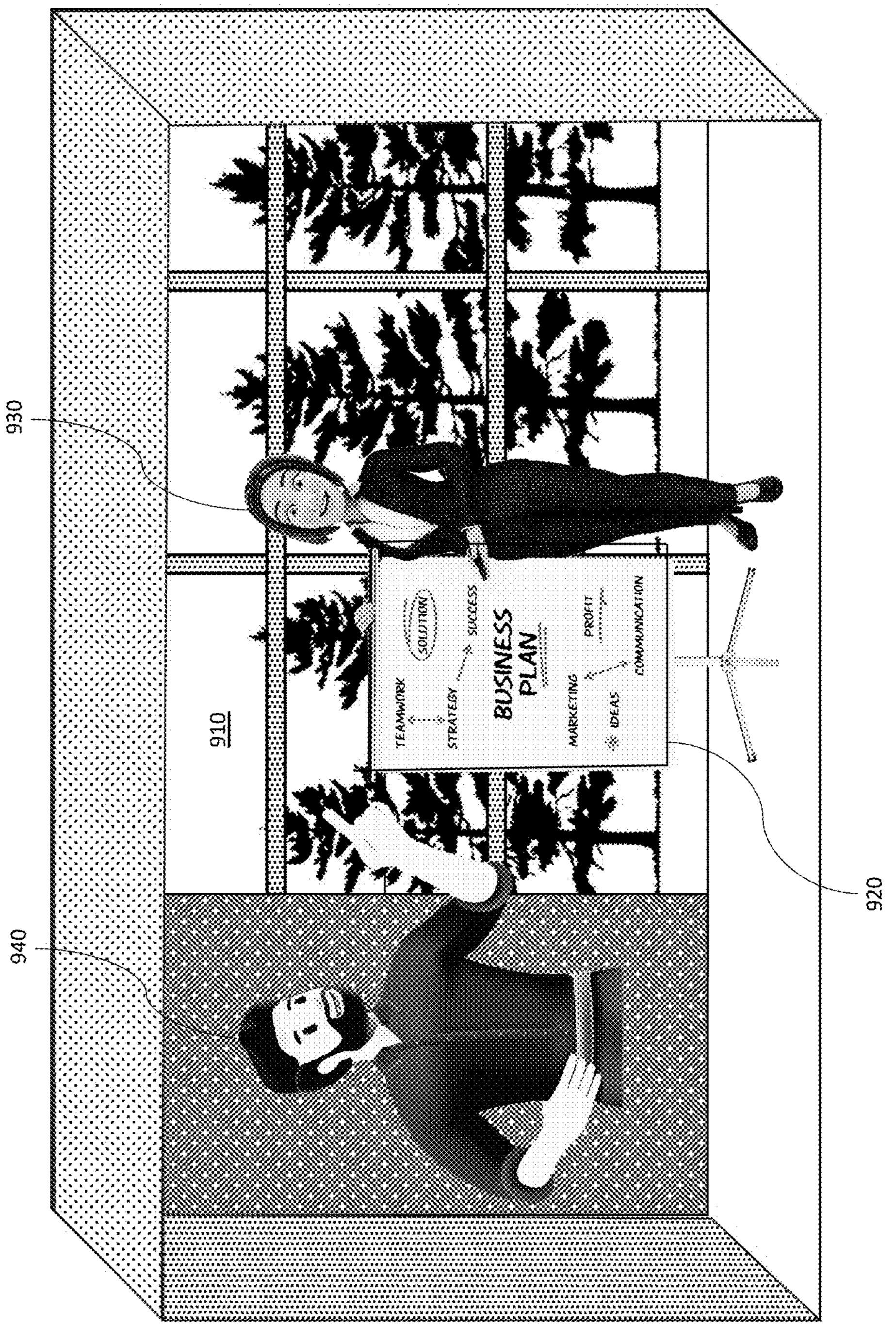
FIGS. 9A-9B are schematic illustrations of presentation spaces, according to an embodiment of the system described herein.
Figure 9B:
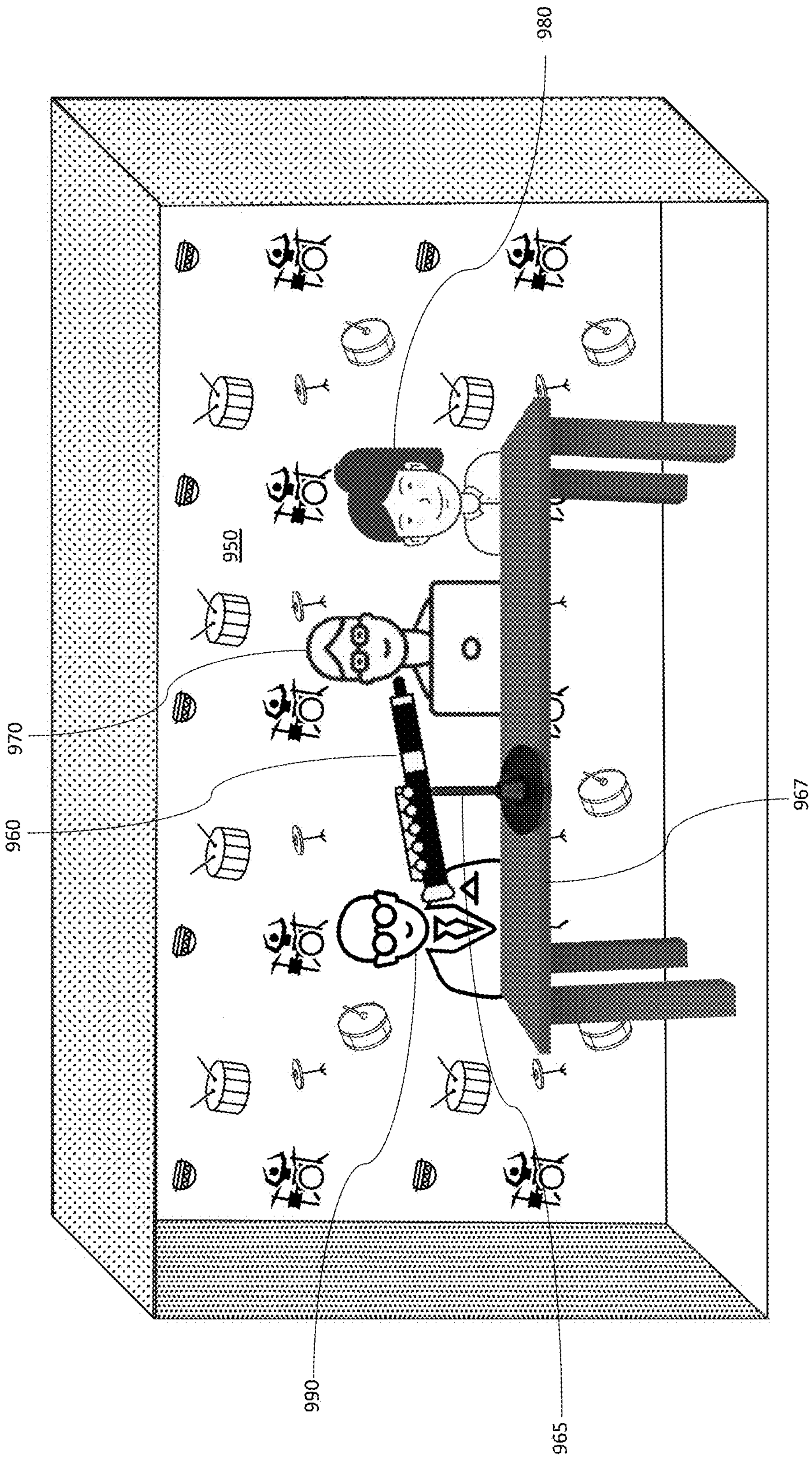

FIGS. 9A-9B are schematic illustrations of presentation spaces.

FIG. 9A schematically illustrates a presentation space with a team of two presenters where the presentation materials are displayed on a paper easel pad. The presentation space in FIG. 9 includes a background environment 910, presentation materials 920, and two presenters 930, 940.

FIG. 9B is a schematic illustration of a presentation with a team of three presenters 970, 980, 990, where the presentation material is a clarinet 960 on a stand 965 placed on a table 967, and a background 950 matches the jazz topic associated with the clarinet 960.

Figure 10:
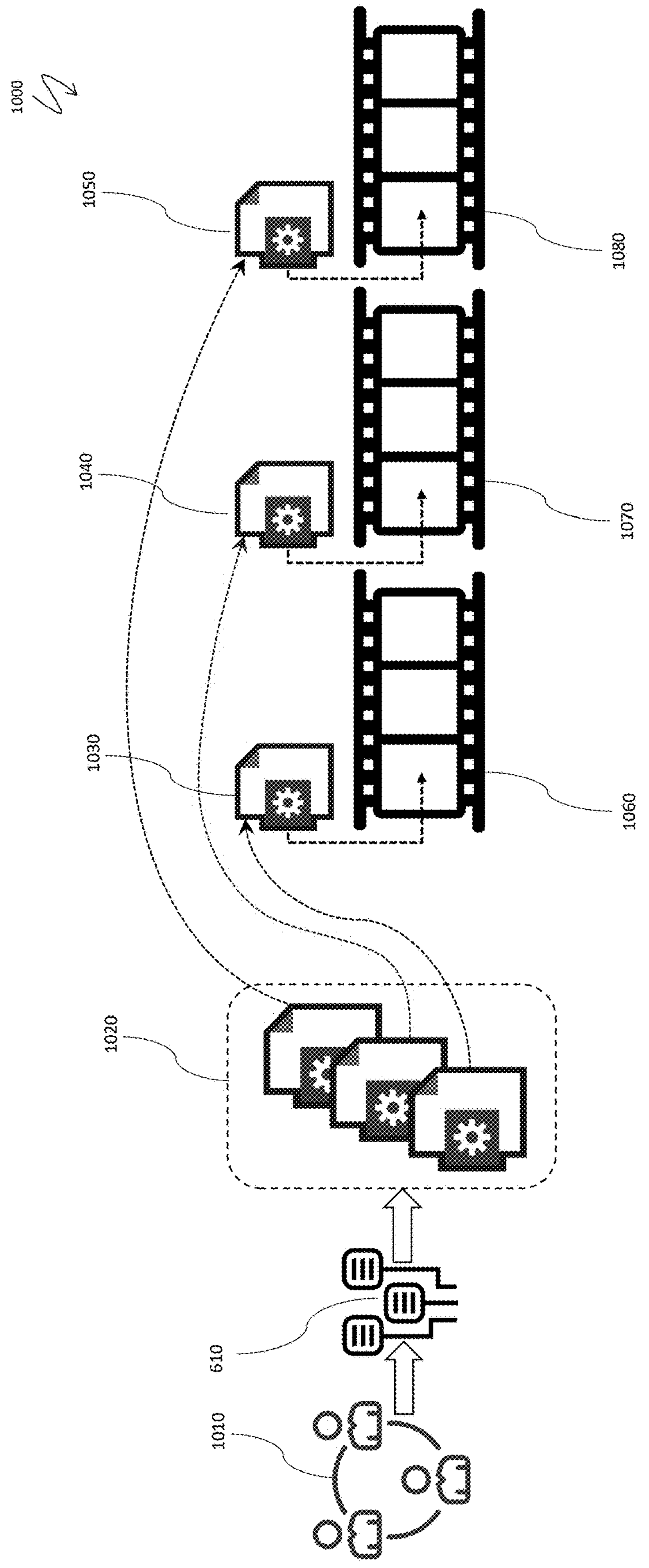
FIG. 10 is a schematic illustration of a presentation architecture with presets, according to an embodiment of the system described herein.

FIG. 10 is a schematic illustration 1000 of a presentation architecture with presets. A presenter team 1010 (see, for example, section 9 of the Summary for more information) develops a presentation scenario 610 (see FIG. 6 for details), splits the presentation into episodes 1060, 1070, 1080, and designs a group 1020 of presets 1030, 1040, 1050, which are used as the starting scenes of the above episodes.

Figure 11:
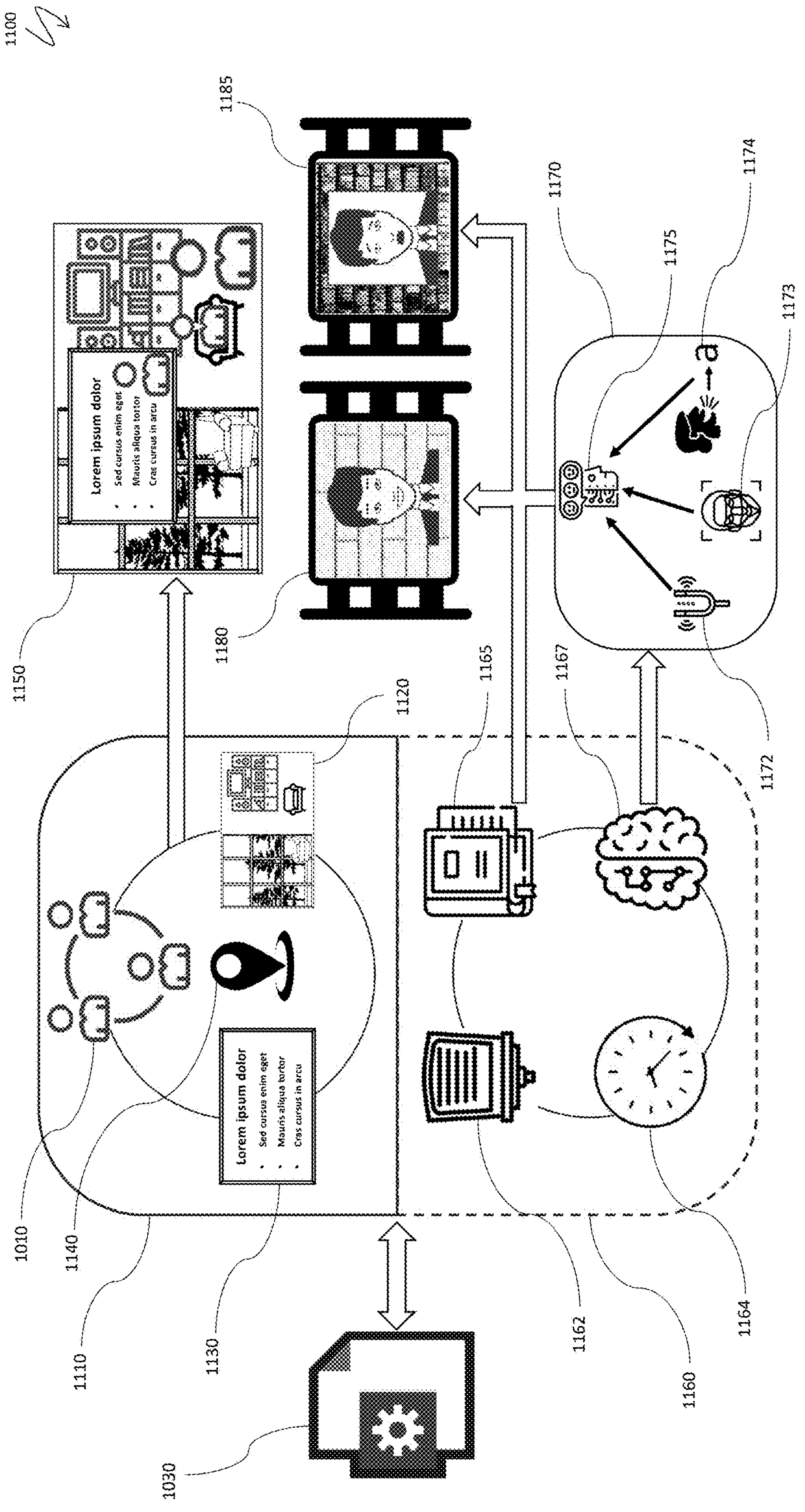
FIG. 11 is a schematic illustration of a preset structure and advanced use, according to an embodiment of the system described herein.

FIG. 11 is a schematic illustration 1100 of the preset structure and advanced use. A mandatory basic part 1110 of the preset descriptor for a preset 1030 (see FIG. 10 and the accompanying text) includes a presentation environment 1120, presentation materials 1130, the presenter team 1010, grouped and placed within a starting scene of an episode 1150 using a location and grouping operation 1140, as explained elsewhere herein (see, for example, section 10 of the Summary and FIGS. 9A-9B).

A preset descriptor for the preset 1030 may also have an optional advanced part 1160, which may include some or all of the following components: teleprompter(s) 1162 for one or more presenters; expiration clock 1164 for presentation time control within an episode; rules 1165 for changing a presentation environment on the fly; and an AI component 1167 that monitors the presentation and utilizes a technology stack 1170 that may include voice emotion recognition 1172, facial recognition 1173, speech recognition 1174 for obtaining transcripts, and sentiment recognition 1175 to identify a sentiment of the presenter team 1010 and apply the rules 1165 for changing presentation environment. An application of the AI component 1167 and the rules 1165 is illustrated by two scenes 1180, 1185, where a change of presenter mood from smiling to sad cause the change of the background color from light to dark.

Figure 12:
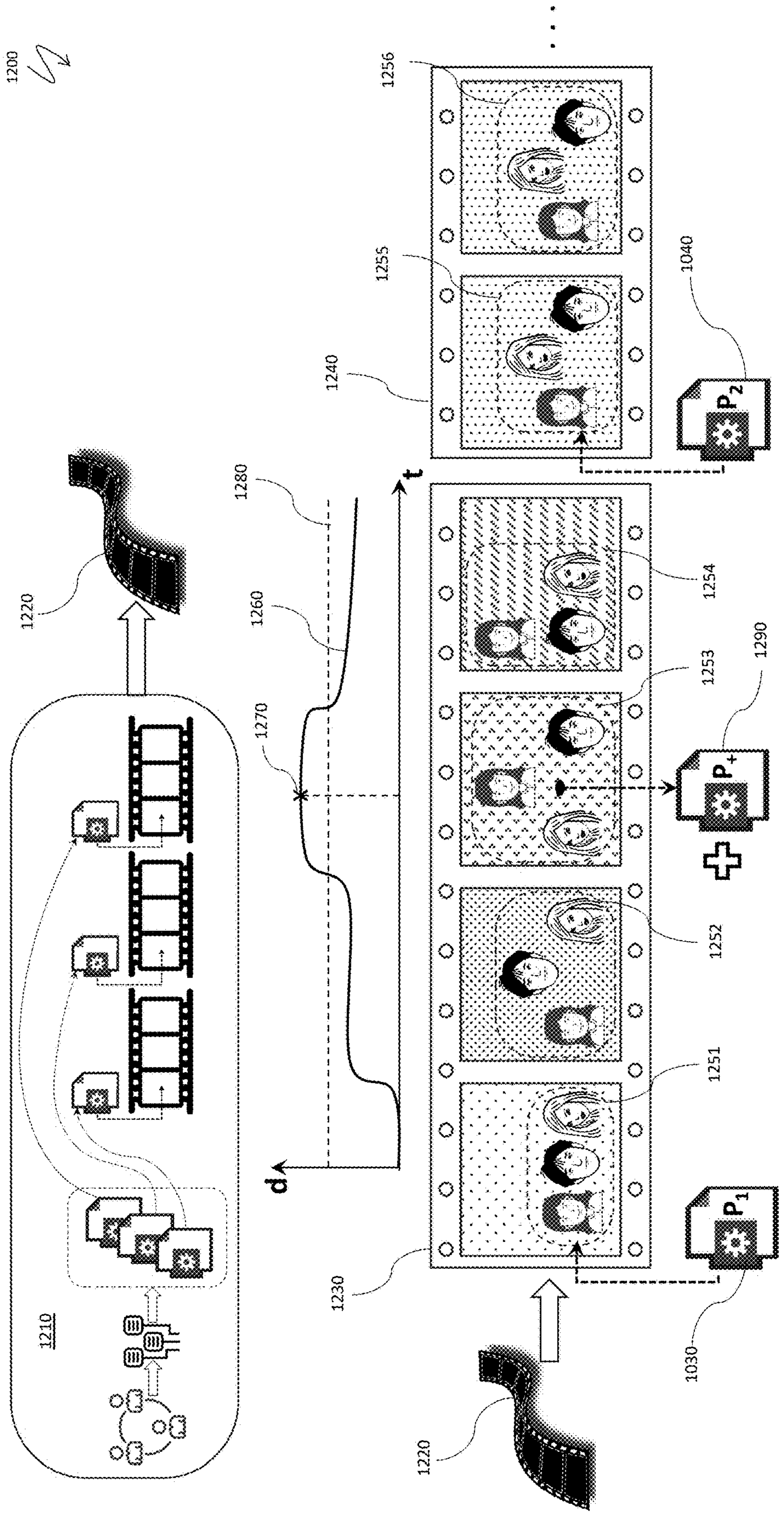
FIG. 12 is a schematic illustration of a dynamic generation of new presets, according to an embodiment of the system described herein.

FIG. 12 is a schematic illustration 1200 of dynamic generation of new presets based on a location of the presenter team 1010 and grouping within the presentation space. An original presentation 1210 (a copy of the architecture from FIG. 10) is recorded and saved as an asynchronous video 1220. The video 1220 is subsequently analyzed episode by episode and scene by scene (frame by frame).

Two episodes 1230, 1240 of the presentation are associated (started with) the presets 1030, 1040 (see FIG. 10 for definitions). The presets 1030, 1040 have presenter configurations 1251, 1255 in the corresponding scenes. The system examines intermediate scenes from the episode 1230 and assesses a delta function $\Delta_{g}$ (.,.) (formula 11.1 of the Summary) for each of a plurality of presenter configurations

1252, 1253, 1254, associated with the scenes with respect to each of the existing preset configurations 1251, 1255, and then takes a minimum of the two values (see subsections 11d(i)-11d(v) of the Summary for details). The configuration 1256 is shown for completeness and does not play any role in building a new preset. A resulting min-delta function 1260 is shown above the video frames. A maximum 1270 of the min-delta function 1260, corresponding to the formula (11.2) of the Summary is higher than a grouping threshold 1280. Therefore, the scene with the presenter configuration 1253 satisfies the conditions for a new dynamically identified preset 1290, which may be inserted into the video and indicate the split of the episode 1230 into two episodes starting with the preset scenes 1030, 1290.

In FIG. 12, the video 1220 is analyzed by quantifying a first difference between each scene of each episode and the presentation preset corresponding to the episode containing the scene and by quantifying a second difference between the scene and the presentation preset of either a subsequent one of the episodes or, for a last one of the episodes, a last scene of the last one of the episodes. For each episode, a determination is made to find a particular scene having a maximum value of a minimum of the first difference and the second difference. The episode is split into two different episodes at the particular scene if a minimum of the first difference and the second difference is greater than a predetermined threshold, in which case a new presentation preset for a second one of the two different episodes is chosen based on the particular scene. The first difference is based on a value of a function aggregating metrics of distance (formula (11.3) of the Summary) between an arrangement of the presenters for each scene of each episode and an arrangement of the presenters for a particular one of the presets corresponding to the episode and the second difference is based on a value of a function aggregating metrics of distance between an arrangement of the presenters for each scene of each episode and an arrangement of the presenters for either one of the presets corresponding to a subsequent one of the episodes or, for a last one of the episodes, a last scene of the last one of the episodes. The metrics of distance between the arrangements of the presenters are a distance between full or partial orders of the presenters (see Sections 11.d.i-11.d.ii of the Summary), a ratio of average Hausdorff distances between all pairs of images of the presenters (Section 11.d.iii of the Summary), and/or a distance between bounding rectangles, and/or cubes of the collections of presenter images (Section 11.d.iv of the Summary).

Figure 13:
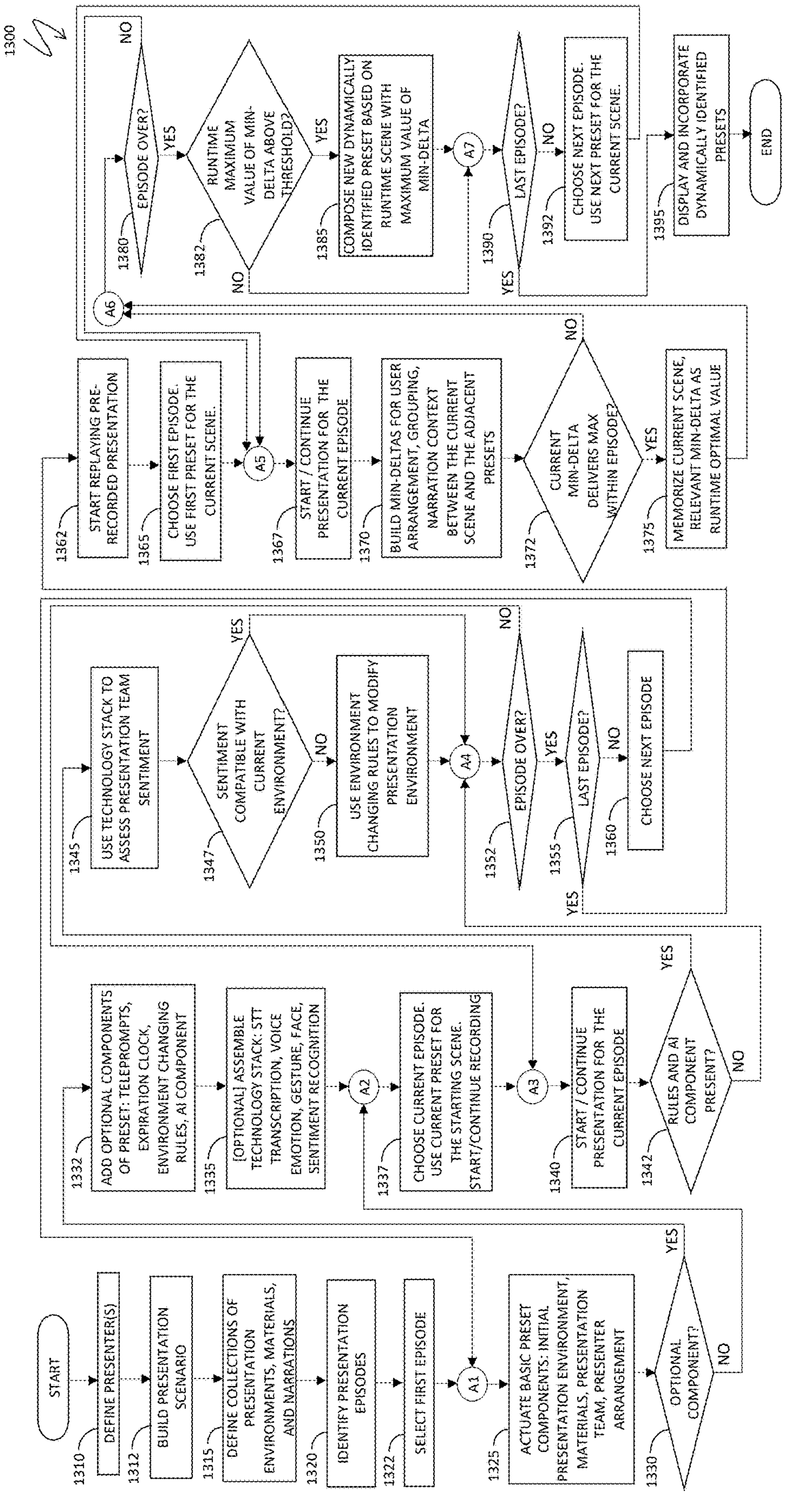
FIG. 13 is a system flow diagram illustrating system functioning in connection with construction, usage, and dynamic generation of presets, according to an embodiment of the system described herein.

Referring to FIG. 13, a flow diagram 1300 illustrates system functioning in connection with construction, usage, and dynamic generation of presets. Processing begins at a step 1310, where the presenter team is defined. After the step 1310, processing proceeds to a step 1312, where the presentation team or other entity creates a presentation scenario. After the step 1312, processing proceeds to a step 1315, where collections of presentation environments, materials, and narrations are defined. After the step 1315, processing proceeds to a step 1320, where the presentation episodes are identified. After the step 1320, processing proceeds to a step 1322, where the first episode is selected. After the step 1322, processing proceeds to a step 1325, where the basic preset components for the current episode are actuated (see FIG. 11 for more information). After the step 1325, processing proceeds to a test step 1330, where it is determined whether the current preset has optional (advanced) components (see FIG. 11 and the accompanying text for details). If so, processing proceeds to a step 1332, where the optional components of the current preset are added to the presentation system. After the step 1332, processing proceeds to an optional step 1335, where the technology stack is assembled, as explained in FIG. 11 and the accompanying text (note that the step 1335 is executed only if the optional components of the current preset include the item 1167 from FIG. 11, the AI component).

After the step 1335, processing proceeds to a step 1337, where the current episode is chosen, the current preset is used as the starting scene, and the recording of the presentation is started or continued. Note that the step 1337 may be independently reached from the test step 1330 if it is determined that the optional preset components are absent. After the step 1337, processing proceeds to a step 1340, where the presentation for the current episode is started or continued. After the step 1340, processing proceeds to a test step 1342, where it is determined whether rules for changing presentation environment on the fly and the AI component are present (see FIG. 11 and the accompanying text for more information). If so, processing proceeds to a step 1345, where the technology stack is used to assess presentation team sentiment. After the step 1345, processing proceeds to a test step 1347, where it is determined whether the sentiment is compatible with the current background environment. If not, processing proceeds to a step 1350, where the environment changing rules are used to modify the presentation environment. After the step 1350, processing proceeds to a test step 1352, where it is determined whether the current episode is over. Note that the test step 1352 may be independently reached from the test step 1347 if it is determined that the assessed sentiment is compatible with the current presentation environment, and from the test step 1342 if it is determined that the rules for changing presentation environment on the fly or the AI component are not present among the optional components of the current preset. If it is determined at the test step 1352 that the current episode is not over, processing proceeds to the step 1340, which may be independently reached from the step 1337; otherwise, processing proceeds to a test step 1355, where it is determined whether the current episode is the last episode. If not, processing proceeds to a step 1360, where the next episode is chosen. After the step 1360, processing proceeds to the step 1325, which may be independently reached from the step 1322.

If it is determined at the test step 1355 that the current episode is the last episode, processing proceeds to a step 1362, where the system starts replaying the pre-recorded presentation (see FIG. 12 and the accompanying text for details). After the step 1362, processing proceeds to a step 1365, where the system chooses the first episode and uses the first preset for the current scene. After the step 1365, processing proceeds to a step 1367, where the system starts or continues replaying presentation for the current episode. After the step 1367, processing proceeds to a step 1370, where the min-delta values between the current scene and the two adjacent presets (or the preset for the current episode and the last scene in the presentation if the current episode is the last episode) are calculated for various presentation parameters, such as user arrangement and grouping, narration context, etc. (see section 11 of the Summary and FIG. 12 with the accompanying text). After the step 1370, processing proceeds to a test step 1372, where it is determined whether the min-delta values calculated at the step 1370 deliver the maximum of min-delta values among all scenes processed from the start of the current episode. If so, processing proceeds to a step 1375, where the current scene and the runtime optimal (maximum) value of min-delta are memorized. After the step 1375, processing proceeds to a test step 1380, where it is determined whether the current episode is over. If not, processing proceeds to the step 1367, which may be independently reached from the step 1365; otherwise, processing proceeds to a test step 1382, where it is determined whether the runtime maximum min-delta value (memorized at the step 1375) is above the predefined threshold for the specific parameter for which min-delta value has been calculated (see sections 11b-11c of the Summary for explanations and formulas). If so, processing proceeds to a step 1385, where a new dynamically identified preset is composed based on the runtime scene that has delivered the maximum min-delta value for the current episode.

After the step 1385, processing proceeds to a test step 1390, where it is determined whether the current episode is the last episode. If so, processing proceeds to a step 1395, where all new dynamically identified presets for various episodes are displayed, offered for incorporation, and selected new presets may be incorporated for future instances of the presentation. After the step 1395, processing is complete. If it is determined at the test step 1390 that the current episode is not the last episode, processing proceeds to a step 1392, where the next episode is chosen and the corresponding preset is used for the current scene. After the step 1392, processing proceeds to the step 1397, which may be independently reached from the step 1365 and the test step 1380. If it is determined at the test step 1372 that the current min-delta value does not deliver the maximum of min-delta values among all scenes processed from the start of the current episode, processing proceeds to the test step 1380, which may be independently reached from the step 1375.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: IOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of modifying a video presentation, comprising:

preparing a plurality of presentation presets for a plurality of episodes of the video presentation, each of the presentation presets including a set of one or more presenters for the video presentation, materials for the video presentation, and a background environment for the video presentation;

choosing an initial one of the presentation presets for each of the episodes;

analyzing the video presentation by quantifying a first difference between each scene of each episode and the presentation preset corresponding to the episode containing the scene and by quantifying a second difference between the scene and the presentation preset of either a subsequent one of the episodes or, for a last one of the episodes, a last scene of the last one of the episodes;

determining a particular scene of each episode having a maximum value of a minimum of the first difference and the second difference;

splitting at least one of the episodes into two different episodes at the particular scene in response to a minimum of the first difference and the second difference corresponding to the particular scene being greater than a predetermined threshold; and choosing a new presentation preset for a second one of the two different episodes based on the particular scene, wherein the first difference is based on a value of a function aggregating metrics of distance between an arrangement of the presenters for each scene of each episode and an arrangement of the presenters for a particular one of the presentation presets corresponding to the episode and the second difference is based on a value of a function aggregating metrics of distance between an arrangement of the presenters for each scene of each episode and an arrangement of the presenters for either one of the presentation presets corresponding to a subsequent one of the episodes or, for a last one of the episodes, a last scene of the last one of the episodes.

2. The method of claim 1, wherein the background environment includes a structured list of visual components and parameters therefor.

3. The method of claim 1, wherein at least some of the presentation presets include optional components.

4. The method of claim 3, wherein the optional components include at least one of the following: at least one teleprompter for one or more of the presenters, an expiration clock for presentation time control within an episode, rules for changing a background environment, and an artificial intelligence component that monitors the video presentation and utilizes a technology stack.

5. The method of claim 4, wherein the technology stack includes voice emotion recognition, facial recognition, speech recognition for obtaining transcripts, and sentiment recognition to identify a sentiment of the presenter team and apply the rules for changing the background environment.

6. The method of claim 1, wherein the background environment is a physical background environment.

7. The method of claim 6, wherein a visual component is superimposed on at least one portion of the physical background environment.

8. The method of claim 6, wherein a plurality of virtual layers are superimposed with the physical background environment.

9. The method of claim 1, wherein the metrics of distance between the arrangements of the presenters are at least one of: a distance between full or partial orders of the presenters, a ratio of average Hausdorff distances between all pairs of images of the presenters, a distance between bounding rectangles, or cubes of the collections of presenter images.

10. A non-transitory computer readable medium containing software that, when executed by a processor, modifies a video presentation, the software comprising:

executable code that chooses an initial one of a plurality of presentation presets for each episode of a plurality of episodes of the video presentation, each of the presentation presets including a set of one or more presenters for the video presentation, materials for the video presentation, and a background environment for the video presentation;

executable code that analyzes the video presentation by quantifying a first difference between each scene of each episode and the presentation preset corresponding to the episode containing the scene and by quantifying a second difference between the scene and the presentation preset of either a subsequent one of the episodes or, for a last one of the episodes, a last scene of the last one of the episodes;

executable code that determines a particular scene of each episode having a maximum value of a minimum of the first difference and the second difference;

executable code that splits at least one of the episodes into two different episodes at the particular scene in response to a minimum of the first difference and the second difference corresponding to the particular scene being greater than a predetermined threshold; and executable code that chooses a new presentation preset for a second one of the two different episodes based on the particular scene, wherein the first difference is based on a value of a function aggregating metrics of distance between an arrangement of the presenters for each scene of each episode and an arrangement of the presenters for a particular one of the presentation presets corresponding to the episode and the second difference is based on a value of a function aggregating metrics of distance between an arrangement of the presenters for each scene of each episode and an arrangement of the presenters for either one of the presentation presets corresponding to a subsequent one of the episodes or, for a last one of the episodes, a last scene of the last one of the episodes.

11. The non-transitory computer readable medium of claim 10, wherein the background environment includes a structured list of visual components and parameters therefor.

12. The non-transitory computer readable medium of claim 10, wherein at least some of the presentation presets include optional components.

13. The non-transitory computer readable medium of claim 12, wherein the optional components include at least one of the following: at least one teleprompter for one or more of the presenters, an expiration clock for presentation time control within an episode, rules for changing a background environment, and an artificial intelligence component that monitors the video presentation and utilizes a technology stack.

14. The non-transitory computer readable medium of claim 13, wherein the technology stack includes voice emotion recognition, facial recognition, speech recognition for obtaining transcripts, and sentiment recognition to identify a sentiment of the presenter team and apply the rules for changing the background environment.

15. The non-transitory computer readable medium of claim 10, wherein the background environment is a physical background environment.

16. The non-transitory computer readable medium of claim 15, wherein at least one of: a visual component or a plurality of virtual layers are superimposed on at least one portion of the physical background environment.

* * * * *